(12) United States Patent
Tsaur et al.

(10) Patent No.: US 8,170,994 B2
(45) Date of Patent: May 1, 2012

(54) TECHNIQUES FOR VIRTUAL ARCHIVING

(75) Inventors: Ynn-Pyng Tsaur, Oviedo, FL (US);
William Cochran, Orlando, FL (US)

(73) Assignee: Symantec Corporation, Mountain View, CA (US)

( * ) Notice: Subject to any disclaimer, the term of this patent is extended or adjusted under 35 U.S.C. 154(b) by 427 days.

(21) Appl. No.: 11/931,750

(22) Filed: Oct. 31, 2007

(65) Prior Publication Data

US 2009/0089523 A1    Apr. 2, 2009

Related U.S. Application Data

(60) Provisional application No. 60/976,298, filed on Sep. 28, 2007.

(51) Int. Cl.
*G06F 7/00* (2006.01)

(52) U.S. Cl. ......... 707/661; 709/211; 709/217; 715/255

(58) Field of Classification Search .................. 707/204, 707/661
See application file for complete search history.

(56) References Cited

U.S. PATENT DOCUMENTS 5,842,222 A     11/1998  Lin et al.
7,546,428 B1 *  6/2009   McAndrews et al. ......... 711/161
2003/0191849 A1* 10/2003 Leong et al. .................. 709/229
2004/0006702 A1* 1/2004  Johnson ......................... 713/189
2007/0185879 A1  8/2007  Roublev et al.

FOREIGN PATENT DOCUMENTS

| EP | 0 899 662 | 3/1999 |
| JP | 2001075843 | 3/2001 |
| JP | 2006031464 | 2/2006 |
| WO | WO 01/06368 | 1/2001 |
| WO | WO 2007/056290 | 5/2007 |

OTHER PUBLICATIONS

Farley, M., "Storage Networking Fundamentals", Cisco Press, XP-002513958, Copyright © 2005.
Lee, J., "Database Archiving Complements Faster Backup", Information Management & Technology, XP001249206, Oct. 2005.
Santry, D., et al., "Deciding When to Forget the Elephant File System", Proceedings of the ACM Symposium on Operating Systems Principles, vol. 33, No. 5, XP002393407, Dec. 1999.
Extended European Search Report in Application No. 081653776.6-2201, dated Mar. 3, 2009.

* cited by examiner

*Primary Examiner* — Fazlul Quader
(74) *Attorney, Agent, or Firm* — Wilmer Cutler Pickering Hale and Dorr LLP

(57) ABSTRACT

Techniques for virtual archiving are disclosed. In one particular exemplary embodiment, the techniques may be realized as a method for performing virtual archiving comprising applying archiving rules to a backup catalog, generating a virtual archive catalog based at least in part on a result of applying archiving rules to the backup catalog, determining a backup image associated with the virtual archive catalog becoming expired and converting the backup image into an archive image.

16 Claims, 3 Drawing Sheets

TECHNIQUES FOR VIRTUAL ARCHIVING

CROSS-REFERENCE TO RELATED APPLICATIONS

This patent application claims priority to U.S. Provisional Patent Application No. 60/976,298, filed Sep. 28, 2007, which is hereby incorporated by reference herein in its entirety.

FIELD OF THE DISCLOSURE

The present disclosure relates generally to data storage systems and, more particularly, to techniques for virtual archiving.

BACKGROUND OF THE DISCLOSURE

In current Information Technology (IT) environments, duplicate copies of data may be made by data backup and data archiving. Data backup and data archiving may be performed by moving and/or copying data from an online storage tier (e.g., hard drives of client machines) to near-line or off-line storage. However, combining the two tasks may be difficult because data backup and data archiving may serve distinct but necessary functions.

The purpose of backup may be to provide protection and operational recoverability for client machines. For example, a backup application may take snapshots of active data periodically to generate backup images. Data from backup images may be used to restore a computer to an operational state following a disaster, or restore a number of files after they have been accidentally deleted or corrupted. Backup operations therefore protect active data that may be changing on a frequent basis. However, most backup images are retained only for a short period of time (e.g., a few days or a few weeks) as later backup images supersede previous versions. Thus, backup may be designed as a short-term insurance policy to facilitate disaster recovery.

The purpose of archiving may be to reduce storage usage on client machines by removing stale but historically important data to archives. Also, archives may be created to comply with legislation and good corporate governance practices. Archived data may be stored for a long period of time (e.g., years or decades). For example, an archive may be designed to provide ongoing access to decades of business information. Therefore, archived data may need to be maintained for a longer period of time than is required for backup data.

Another difficulty for combining data backup and data archiving may be volume of data for backup and archive. Generally, data needing to be archived may be only a small percentage of data needing to be backed up. For example, a backup image may be a snapshot of a hard drive or some folders of a hard drive, which may contain a lot of active data in addition to stale data. The active data may become obsolete in days or weeks. Only the stale data may need to be archived. Therefore, using backup data for archival purposes is generally not suitable due to the tremendous storage requirement of maintaining backup images for long periods of time. However, performing both archiving and backup operations results in double data movement and double storage requirement.

In view of the foregoing, it may be understood that there are significant problems and shortcomings associated with current data backup and data archiving technologies.

SUMMARY OF THE DISCLOSURE

Techniques for virtual archiving are disclosed. In one particular exemplary embodiment, the techniques may be realized as a method for performing virtual archiving comprising applying archiving rules to a backup catalog, generating a virtual archive catalog based at least in part on a result of applying archiving rules to the backup catalog, determining a backup image associated with the virtual archive catalog becoming expired and converting the backup image into an archive image.

In accordance with other aspects of this particular exemplary embodiment, the backup image or the archive image may be stored on a network connected storage.

In accordance with further aspects of this particular exemplary embodiment, converting the backup image into an archive image further may comprise converting the backup image into the archive image in place or copying items required for archiving to the archive image. In addition, copying items for archiving to the archive image may be performed before or after the backup image expires.

In accordance with additional other aspects of this particular exemplary embodiment, the method may further comprise marking the backup image as expired after converting the backup image into the archive image.

In accordance with still further aspects of this particular exemplary embodiment, at least one processor readable carrier for storing a computer program of instructions configured to be readable by at least one processor for instructing the at least one processor to execute a computer process for performing the method is provided.

In another particular exemplary embodiment, the techniques may be realized as a system for performing virtual archiving comprising: means for applying archiving rules to a backup catalog, means for generating a virtual archive catalog based at least in part on a result of applying archiving rules to the backup catalog, means for determining a backup image associated with the virtual archive catalog becoming expired, and means for converting the backup image into an archive image.

In accordance with other aspects of this particular exemplary embodiment, the backup image or the archive image may be stored on a network connected storage, and the system may further comprise a network in communication with the network connected storage.

In another particular exemplary embodiment, the techniques may be realized as a system for performing virtual archiving comprising a computing device connected to a network configured to: apply archiving rules to a backup catalog, generate a virtual archive catalog based at least in part on a result of applying archiving rules to the backup catalog, determine a backup image associated with the virtual archive catalog becoming expired, and convert the backup image into an archive image.

In accordance with other aspects of this particular exemplary embodiment, the computing device may be a backup server.

In accordance with further aspects of this particular exemplary embodiment, the step of converting the backup image into an archive image may further comprise determining the backup image cannot be converted to the archive image in place and copying items required for archiving to the archive image.

In accordance with additional other aspects of this particular exemplary embodiment, the step of converting the backup image into an archive image may further comprise determining the backup image can be converted to the archive image in place, and converting the backup image into the archive image in place.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
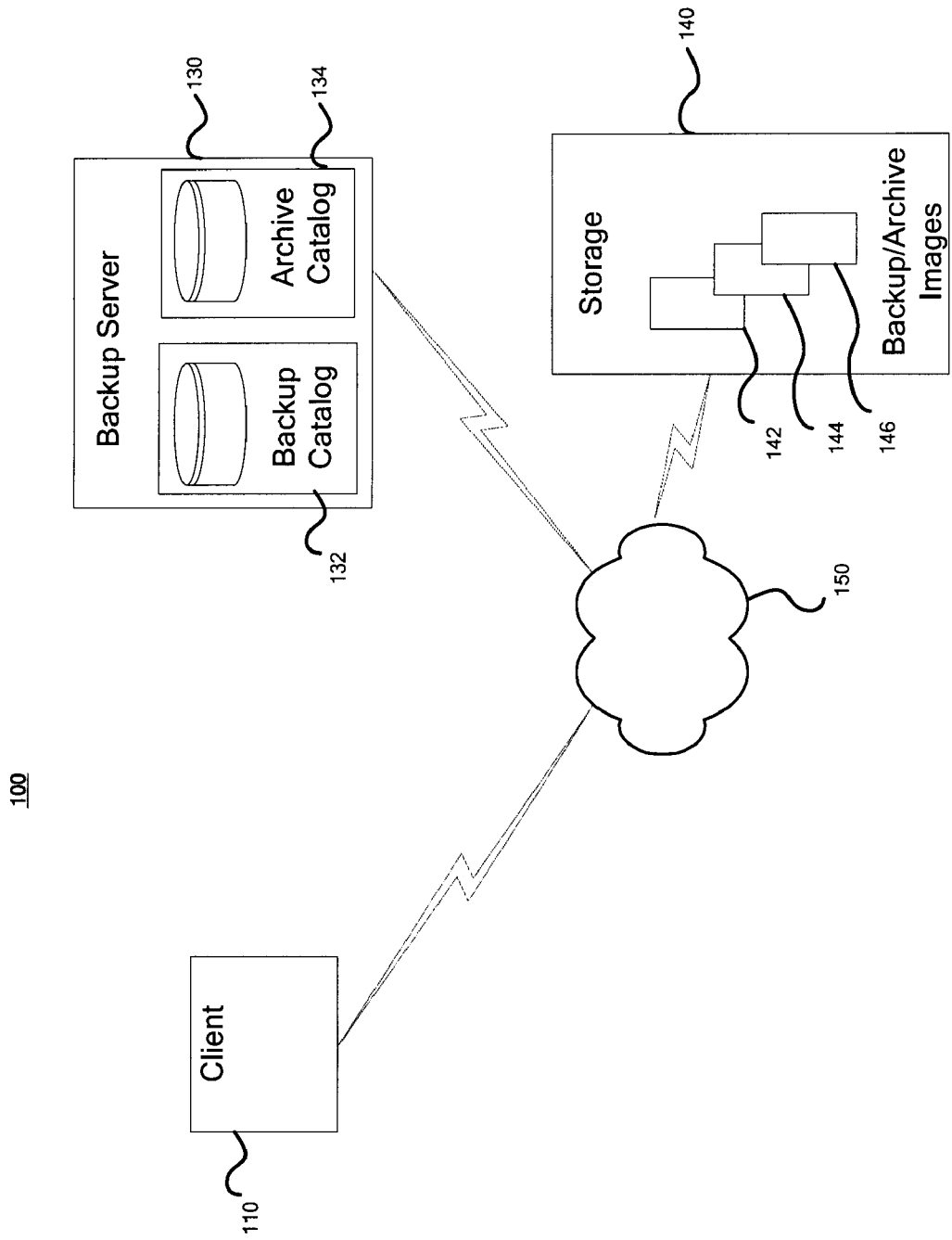
FIG. 1 shows a system for virtual archiving in accordance with an embodiment of the present disclosure.

Referring to FIG. 1, there is shown a system 100 for performing virtual archiving in accordance with an embodiment of the present disclosure. Client 110 may represent a computing device that contains data that needs archiving and backup. Client 110 may be operatively connected to a network 150. Backup server 130 may be a computing device adapted to perform backup and archiving of the Client 110. Backup server 130 may contain a backup catalog 132 and an archive catalog 134. In one or more embodiments, backup catalog 132 and archive catalog 134 may be contained on separate computing devices other than backup server 130. Backup server 130 may be operatively connected to network 150 and may manage backup and archiving operations for one or more clients (e.g., Client 110) on network 150. Backup server 130 may utilize storage 140 for backup and archive storage. Storage 140 may be a storage area network, a raid array, a tape drive, a disk drive or other storage devices. Storage 140 may contain backup and/or archive images 142, 144 and 146.

Backup server 130 may create backup images for Client 110. Each created backup image may be associated with the backup catalog 132. For example, backup server 130 may take a snapshot of active data on Client 110 to generate the backup image 142. The backup image 142 may be stored on storage 140. Information (e.g., table of contents, metadata for each object on a backup image) for the backup image 142 may be stored in the backup catalog 132. The backup catalog 132 therefore may be a central repository that contains information for all backup images in storage 140. In some embodiments, the backup catalog 132 may be contained on a computing device separate from the backup server 130. In one or more embodiments, each backup image may have a separate backup catalog respectively.

Archive catalog 134 may be an archive catalog for virtual archive images. That is, archive catalog 134 may be created and/or populated by performing virtual archiving. Virtual archiving may be achieved by applying an archiving rule to backup catalog 132. Applying the archiving rule to the backup catalog 132 may produce a list of items to be archived on the Client 110. The list of items may become entries in the archive catalog 134. Therefore, instead of copying files to be archived from the Client 110 to generate an archive image, a virtual archive image may be created. The virtual archive image may contain items located in one or more backup images. The one or more backup images therefore may be associated with the virtual archive image and the archive catalog 134. Thus, virtual archiving may be performed with zero data movement. In one embodiment, the archive catalog 134 may be stored in a separate machine from the backup catalog 132. In one or more embodiments, the list of items may be sent to the Client 110 to delete data that has been archived in the archive catalog 134.

As noted previously, archived data may need to be maintained for a longer period of time than may be required for backup data. Thus, backup image retention may be different from archive retention. A backup image may expire earlier than a virtual archive image associated with the backup image.

Backup server 130 may detect that one or more backup images may expire earlier than a virtual archive image associated with the one or more expired backup images. If backup server 130 detects one backup image expires earlier than a virtual archive image associated with the backup image, backup server 130 may convert the backup image into a real archival image before mark the backup image as expired.

In one or more embodiments, backup server 130 may convert a backup image into a real archive image in place. That is, backup server 130 may convert the backup image into an archive image without data movement. In these embodiments, backup images may be kept on rewritable media (e.g., disks, hard drives and tapes). Further, the underlying storage system may support sparse file technology (e.g., Window NT 4.0 and later, Unix operating systems). In these embodiments, the expired backup images may be converted in place to archive image with zero data movement by clearing out items not required for archive images from the expired backup images. Clearing out the not required items from the expired backup images may be achieved by appropriate operations on the storage media, such as, but not limited to, punching holes, zeroing out, reclaiming storage space. The backup server 130 may operate with the archive catalog 134 and the backup catalog 132 to perform the converting action on expired backup images in the storage 140.

In one or more embodiments, the expired backup images may not be converted in place. For example, an expired backup image may not be contained on rewritable media or the underlying file system may not support sparse file technology. In those embodiments, an archive image may be created by copying items required for the archive image to the archive image from an expired backup image. For example, the backup server 130 may operate with the archive catalog 134 and backup catalog 132 to identify items needing to be copied from an expired backup image. Then, the backup server 130 may copy those required items to generate a new archive image or copy those required items to an existing archive image. Therefore, an archive for the required items may be created. At this point, the backup server 130 may mark the expired backup image as expired. Thus, the storage 140 may delete or dispose of the backup image that just expired.

In one or more embodiments, before one backup images expires, the backup server 130 may detect that the backup image may be expiring soon. In these embodiments, if the conversion of backup image may be performed in place, the backup server 130 may wait till the backup becoming expired to initiate in place conversion of the backup image. If the conversion of backup image may not be performed in place, the backup server 130 may start copying the required items for archiving to an archive image before the backup image expires. In these embodiments, the backup server 130 may mark the expired backup image as expired only after the backup image retention has expired and conversion of backup image has been completed.

Figure 2:
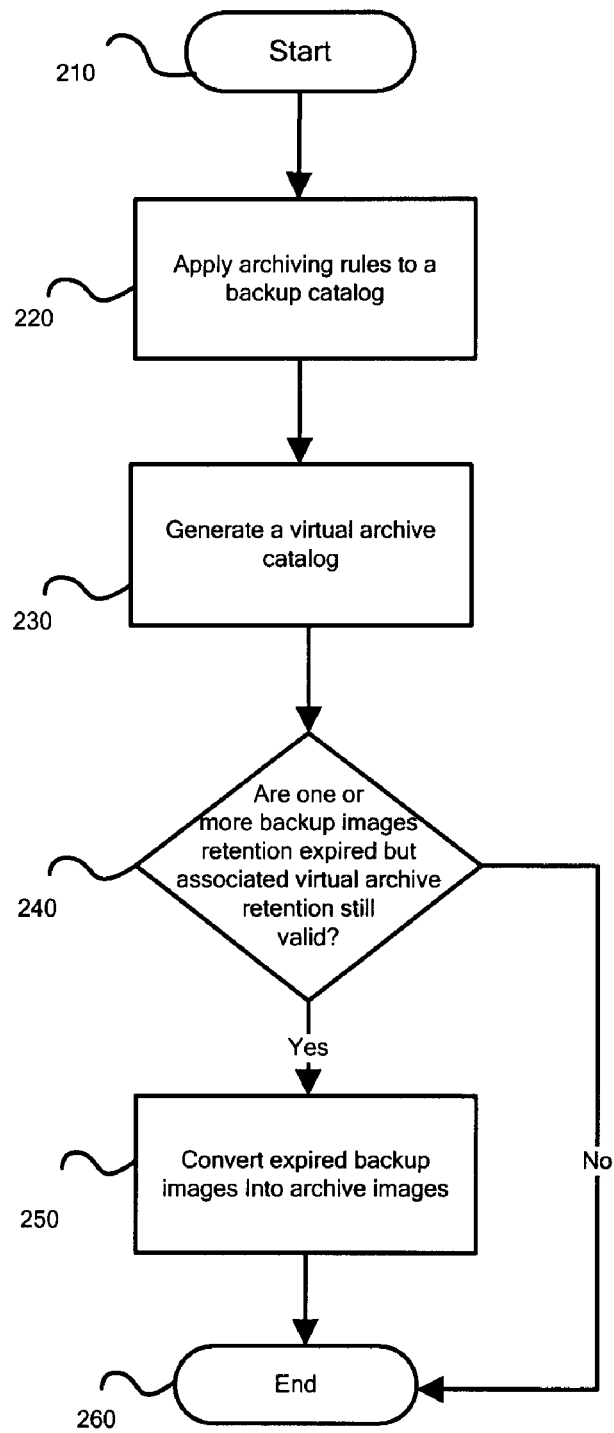
FIG. 2 shows a flow chart illustrating a process for creating a virtual archive in accordance with an embodiment of the present disclosure.

Referring to FIG. 2, there is shown a method 200 for virtual archiving in accordance with an embodiment of the present disclosure. Method 200 may start at block 210. At block 220, the method 200 may apply archiving rules to a backup catalog. The archiving rules may be client archiving rules. At block 230, the method 200 may generate a virtual archive catalog. The virtual archive catalog may be created by generating a list of items that may need to be archived from one or more backup images. At block 240, the method 200 may determine whether one or more backup images retention are expired but associated virtual archive retention may be still valid. If no backup image is expired, the method 200 may end at block 260. If yes, the method 200 may proceed from block 240 to 250. At block 250, the method 200 may convert the expired one or more backup images into archive images. At block 260, the method 200 may end.

Figure 3:
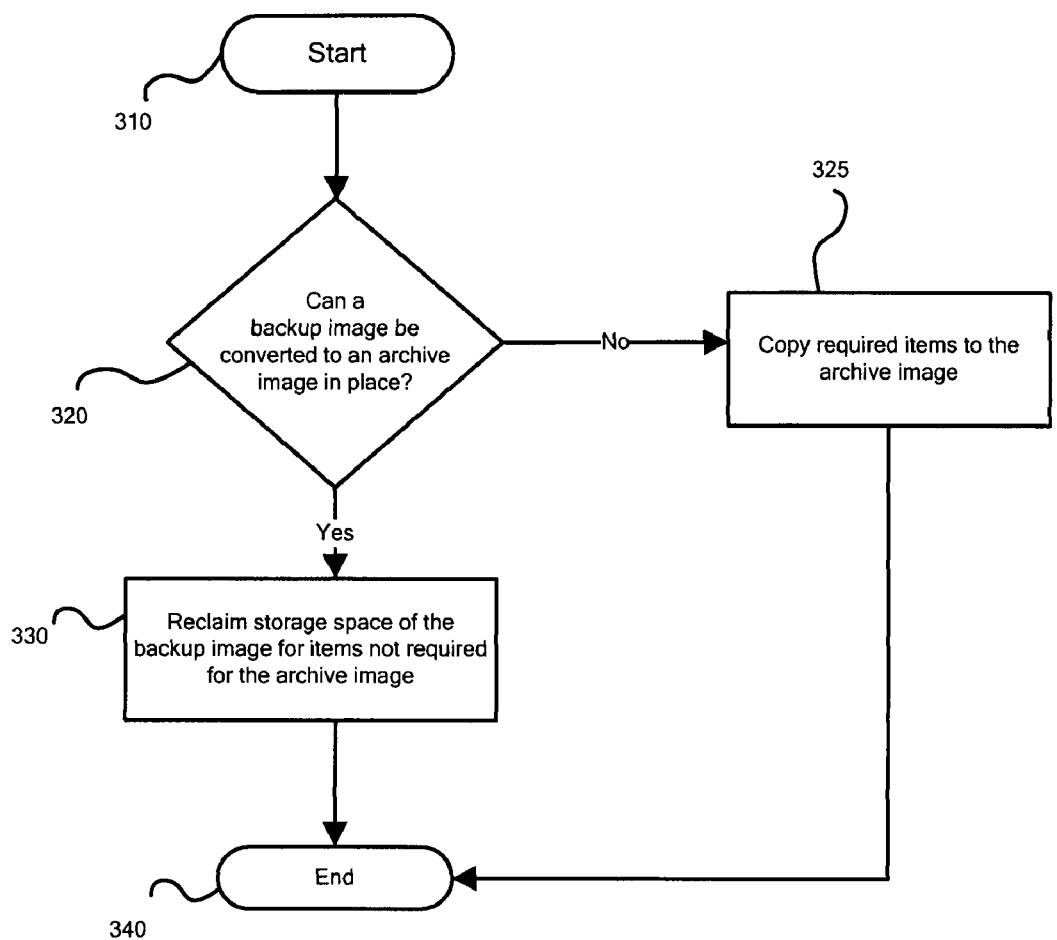
FIG. 3 shows a flow chart illustrating a process for converting an existing backup image into an archive image in accordance with an embodiment of the present disclosure.

Referring to FIG. 3, there is shown a method 300 for converting an expired backup image into an archive image in accordance with an embodiment of the present disclosure. Method 300 may start at block 310. At block 320, the method 300 may determine whether the expired backup image may be converted to an archive image in place. If at block 320, the method 300 determines that the expired backup image cannot be converted to an archive image in place, the method 300 may proceed to block 325. At block 325, the method 300 may copy one or more items required from the expired backup image to an archive image. The method 300 may end at block 340. If at block 320, the method 300 determines that the backup image can be converted to an archive image in place, the method 300 may proceed from block 320 to block 330. At block 330, the method 300 may reclaim storage space of the expired backup image for one or more items not required for the archive image. As noted previously, in one or more embodiments, the expired backup image may be created on rewritable media and the file system may support sparse file technology. In these embodiments, the expired backup image may be converted to an archive image in place with no data movement. That is, data needing to be archived will remain where they are on the expired backup image. However, the expired backup image becomes an archive image. Other items on the expired backup image not required for the archive image will be cleaned out. The storage space for the other objects cleaned out may be reclaimed (e.g., punching holes or zeroing out). At block 340, the method 300 may end.

At this point it should be noted that the technique for shared persistent storage optimization in accordance with the present disclosure as described above typically involves the processing of input data and the generation of output data to some extent. This input data processing and output data generation may be implemented in hardware or software. For example, specific electronic components may be employed in a computer processor or similar or related circuitry for implementing the functions associated with file creation, transfer, deletion, or network communication in accordance with the present disclosure as described above. Alternatively, one or more processors operating in accordance with stored instructions may implement the functions associated with file creation, transfer, deletion, or network communication in accordance with the present disclosure as described above. If such is the case, it is within the scope of the present disclosure that such instructions may be stored on one or more processor readable carriers (e.g., a magnetic disk), or transmitted to one or more processors via one or more signals.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

The invention claimed is:

1. A method for performing virtual archiving comprising:
   applying, using at least one computer processor, archiving rules to a backup catalog;
   generating a virtual archive catalog associated with one or more portions of the backup catalog based at least in part on a result of applying archiving rules to the backup catalog, wherein the virtual archive catalog comprises at least one virtual archive image;
   determining whether a backup image associated with the at least one virtual archive image will expire prior to an expiration of the at least one virtual archive image, wherein the at least one virtual archive image references one or more portions of the backup image to allow archiving of the one or more portions of the backup image without copying the one or more portions of the backup image, and wherein the one or more referenced portions of the backup image are subject to a backup retention date and an archive retention date; and
   generating an archive image based at least in part on the at least one virtual archive image in the event that the backup image will expire prior to the expiration of the at least one virtual archive image, wherein generating the archive image further comprises:
   determining if the backup image is convertible to the archive image in place;
   in the event the backup image is convertible to the archive image in place, converting the backup image into the archive image in place; and
   in the event the backup image is not convertible to the archive image in place, copying items required for archiving to the archive image.

2. The method according to claim 1, wherein the backup image is stored on a network connected storage.

3. The method according to claim 1, wherein the archive image is stored on a network connected storage.

4. The method according to claim 1, wherein generating the archive image further comprises converting the backup image into the archive image in place.

5. The method according to claim 1, wherein generating the archive image further comprises copying items required for archiving to the archive image.

6. The method according to claim 5, wherein copying items required for archiving to the archive image is performed before the backup image expires.

7. The method according to claim 5, wherein copying items required for archiving to the archive image is performed after the backup image expires.

8. The method according to claim 1, further comprising marking the backup image as expired after generating the archive image.

9. At least one non-transitory processor readable storage medium for storing a computer program of instructions configured to be readable by at least one processor for instructing the at least one processor to execute a computer process for performing the method as recited in claim 1.

10. A system for performing virtual archiving comprising:
means for applying archiving rules to a backup catalog;
means for generating a virtual archive catalog associated with one or more portions of the backup catalog based at least in part on a result of applying archiving rules to the backup catalog, wherein the virtual archive catalog comprises at least one virtual archive image;
means for determining whether a backup image associated with the at least one virtual archive image will expire prior to an expiration of the at least one virtual archive image, wherein the at least one virtual archive image references one or more portions of the backup image to allow archiving of the one or more portions of the backup image without copying the one or more portions of the backup image, and wherein the one or more referenced portions of the backup image are subject to a backup retention date and an archive retention date; and
means for generating an archive image based at least in part on the at least one virtual archive image in the event that the backup image will expire prior to the expiration of the at least one virtual archive image, wherein the means for generating the archive image is further configured to:
determine if the backup image is convertible to the archive image in place;
in the event the backup image is convertible to the archive image in place, convert the backup image into the archive image in place; and
in the event the backup image is not convertible to the archive image in place, copy items required for archiving to the archive image.

11. The system according to claim 10, wherein the backup image is stored on a network connected storage.

12. The system according to claim 11, wherein the archive image is stored on the network connected storage.

13. The system according to claim 12, further comprising a network in communication with the network connected storage.

14. A system for performing virtual archiving comprising:
a computing device connected to a network configured to:
apply archiving rules to a backup catalog;
generate a virtual archive catalog associated with one or more portions of the backup catalog based at least in part on a result of applying archiving rules to the backup catalog, wherein the virtual archive catalog comprises at least one virtual archive image;
determine whether a backup image associated with the at least one virtual archive image will expire prior to an expiration of the at least one virtual archive image, wherein the at least one virtual archive image references one or more portions of the backup image to allow archiving of the one or more portions of the backup image without copying the one or more portions of the backup image, and wherein the one or more referenced portions of the backup image are subject to a backup retention date and an archive retention date; and
generate an archive image based at least in part on the at least one virtual archive image in the event that the backup image will expire prior to the expiration of the at least one virtual archive image, wherein generating the archive image further comprises:
determining if the backup image is convertible to the archive image in place;
in the event the backup image is convertible to the archive image in place, converting the backup image into the archive image in place; and
in the event the backup image is not convertible to the archive image in place, copying items required for archiving to the archive image.

15. The system of claim 14, wherein the computing device is a backup server.

16. The method of claim 1, wherein the at least one virtual archive image does not comprise a virtual tape.

\* \* \* \* \*